(12) United States Patent
Gore

(10) Patent No.: US 6,417,248 B1
(45) Date of Patent: Jul. 9, 2002

(54) PREPARATION OF IMPROVED INKS FOR INKJET PRINTERS

(75) Inventor: Makarand P Gore, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/296,456

(22) Filed: Apr. 21, 1999

(51) Int. Cl.$^7$ .................. C09D 11/10; C08L 33/10; C08L 37/00; C08L 25/04; C08L 39/06
(52) U.S. Cl. .................. 523/160; 524/548; 524/549; 524/556; 347/100; 347/102
(58) Field of Search .................. 523/160, 161; 526/260, 264; 524/549, 556, 548; 347/100, 102, 103, 105

(56) References Cited

U.S. PATENT DOCUMENTS

| | | | | |
|---|---|---|---|---|
| 3,529,129 A | * | 9/1970 | Rees | 219/216 |
| 4,162,997 A | | 7/1979 | Walsh | 260/27 R |
| 4,500,895 A | | 2/1985 | Buck et al. | 346/140 R |
| 4,513,298 A | | 4/1985 | Scheu | 346/140 R |
| 4,794,409 A | | 12/1988 | Cowger et al. | 346/140 R |
| 5,249,062 A | * | 9/1993 | Ejiri et al. | 358/296 |
| 5,537,137 A | * | 7/1996 | Held et al. | 347/105 |
| 5,549,740 A | | 8/1996 | Takahashi et al. | 106/20 R |
| 5,596,027 A | * | 1/1997 | Mead et al. | 523/161 |
| 5,640,187 A | | 6/1997 | Kashiwazaki et al. | 347/101 |
| 5,698,017 A | | 12/1997 | Sacripante et al. | 106/31.49 |
| 5,792,249 A | | 8/1998 | Shirota et al. | 106/31.27 |
| 5,817,169 A | | 10/1998 | Sacripante et al. | 106/31.43 |
| 5,831,655 A | | 11/1998 | Asawa et al. | 347/102 |
| 5,846,306 A | * | 12/1998 | Kubota et al. | 106/31.75 |
| 5,854,307 A | * | 12/1998 | Kimura et al. | 523/161 |
| 5,854,331 A | * | 12/1998 | Ma et al. | 524/505 |
| 5,889,083 A | * | 3/1999 | Zhu | 523/161 |
| 5,912,280 A | * | 6/1999 | Anton et al. | 523/161 |
| 5,936,008 A | * | 8/1999 | Jones et al. | 523/161 |
| 6,027,210 A | * | 2/2000 | Kurabayshi et al. | 347/100 |
| 6,080,229 A | * | 6/2000 | Watanabe et al. | 106/31.43 |
| 6,276,792 B1 | * | 8/2001 | Gundlach et al. | 347/101 |

FOREIGN PATENT DOCUMENTS

| | | | |
|---|---|---|---|
| EP | 606490 | * | 7/1994 |
| EP | 775596 | * | 5/1997 |
| WO | 0591916 | | 4/1994 |

OTHER PUBLICATIONS

U.S. application Ser. No. 08/250,31 A1, Kronzer et al., filed Feb. 25, 1998.

U.S. application Ser. No. 08/510,12A2, Page et al., filed Jul. 1, 1998.

* cited by examiner

Primary Examiner—Vasu Jagannathan
Assistant Examiner—Callie E. Shosko

(57) ABSTRACT

The invention relates to an improved system for inkjet printing which results in images with increased permanence as measured by transfer of color from the image when the image is subjected to mechanical and/or chemical abrasion. The invention provides a fusible material that may be combined with any or all of the color inks used to create the image, or it may be used as a colorless fluid applied pre- or post-printing. The permanence of images produced by the system are comparable to those produced by electrophotography.

The invention also relates to a printing apparatus that contains a means for fusing the image using heat applied after printed substrate is ejected from the printer. Methods for utilizing these improvements and examples of them are described.

7 Claims, No Drawings

PREPARATION OF IMPROVED INKS FOR INKJET PRINTERS

TECHNICAL FIELD

The present invention relates to printing technology. More specifically, it relates to an improved ink composition for use in inkjet printers. Even more specifically, it relates to the use of an improved ink composition, equipment, and methods to produce permanent printed images on a variety of substrates by an inkjet printer.

BACKGROUND OF THE INVENTION

Along with the computerization of offices in the 1980's came electronically controlled non-impact printers such as the ink jet and laser printers. Drop-on-demand inkjet printers can be piezo or thermal (bubble jet). In piezo ink jet systems, ink droplets are ejected by an oscillating piezo crystal. However, the thermal ink jet dominates the drop-on-demand office ink jet market. In this system, rapid heating behind the ink nozzles causes a bubble of vapor to form in the ink. The resulting bubble expansion and ink ejection from the inkjet printer cartridge causes printing to appear on the substrate.

Full-color inkjet printers are more common than color lasers and are much more economical. The main advantage of inkjet printers over lasers and other non-impact printing techniques include their low cost and simplicity. Thermal inkjet systems are capable of dispensing ink rapidly and accurately. The technology of this and other inkjet systems are discussed in the *Chemistry and Technology of Printing and Imaging Systems*, edited by P. Gregory, published by Chapman & Hall, 1996. Representative thermal inkjet systems and cartridges are discussed in U.S. Pat. No. 4,500,895 to Buck et al., U.S. Pat. No. 4,513,298 to Scheu, and U.S. Pat. No. 4,794,409 to Cowger et al., which are all hereby incorporated by reference.

The technology of inkjet printers has undergone many changes and improvements since they first appeared. Research has been conducted to ensure that the images produced are of consistent high quality. Thus, it is important that the images be waterfast and do not smear, smudge, run, or the like when exposed to chemical or mechanical abrasion. Non-smearing of the image when portions of the printed page are highlighted with colored markers is of particular interest. Oftentimes, the image produced by the inkjet printer on paper is not satisfactorily fixed and smears, blurring the printed image when subjected to highlighting. This type of image is not regarded as permanent.

Image permanence is defined as transference of color from the substrate when the image printed thereon is subjected to chemical and mechanical abrasion. Highlighting is oftentimes the form of chemical and mechanical abrasion experienced. This transference of color is measured by optical density (mOD). More permanent images have lower milli-Optical Density (mOD) values.

Another desired feature of printed images is light fastness. As used herein, light fastness will mean that the images do not fade when exposed to light. Light fastness is another measure of permanence as used herein. Light fastness is measured by exposing printed images to intense light in light chambers (fadometers) and comparing print density before and after the exposure.

There have been many past attempts at improving the permanence of water-based inkjet printing systems. Included among these attempts are U.S. Pat. No. 5,549,740 to Takahashi et al., U.S. Pat. No. 5,640,187 to Kashiwakazi et al., and U.S. Pat. No. 5,792,249 to Shirota et al. which utilizes an additional or "fifth" pen to apply a colorless fluid on to the substrate. As will be seen in the comparative testing, the mOD values for the images printed thereon are quite high.

In U.S. Pat. No. 5,831,655 Asawa discloses an ink jet recording apparatus that is concerned with forcibly drying the ink deposited on a recording medium so that the image is not scratched when contacted with other objects or blurred because of the quality of paper used.

In the '655 patent, the ink droplet is comprised of a saccharide, plus other ingredients commonly used in inks such as colorant, resin, surfactant and water. There is no mention or values measured for image permanence on various types of paper substrates. Nor is there any mention of measurement of permanence of the images after subjection to chemical and mechanical abrasion using optical density measurements.

Another highly efficient printing system in common use currently is laser printers. In a laser printer or copier, light from a laser beam is used to discharge areas of a photoreceptor to create an electrostatic image of the page to be printed. The image is created by the printer controller, a dedicated computer in the printer, and is passed to the print engine. The print engine transcribes an array of dots created by the printer controller into a printed image. The print engine includes a laser scanning assembly, photoreceptor, toner hopper, developer unit, Corotrons, discharge lamp, fuser, paper transport, paper input feeders, and paper output trays.

The final stage of laser printing or copying is to fix toner onto the paper. Toner is very fine plastic powder, which is transferred from the photoreceptor. Once transferred from the photoreceptor, it lies on the paper in a very thin coating with nothing to hold it in place. In order to fix the toner to the paper, it is heated by passing between a pair of very hot rollers, so that the plastic melts around the fibers of the paper and is "fused" into place. The image is now fixed permanently onto the paper.

The fuser of a typical laser printer is of particular interest to the printing system of this invention. In these systems, fusing or melting the polymeric resin in which the colorant is embedded converts the discrete toner particles into an amorphous film. This film becomes the permanent image that results in electrophotographic copy or laser printed copy. However, the laser printer toners are incompatible with water. Since most inkjet materials are water-based, it is not possible to use laser toners in inkjet printers, and, therefore, Inkjet technology has not yet found a way to make the printed image permanent.

Another printing technology that is inherently more permanent than water-based inkjet are hot-melt inks. These materials are solid at room temperature and are similar to wax crayons. The colorants used in these materials are solvent dyes that are soluble in the ink vehicle or pigment dispersions. Like laser toners, these materials are incompatible with the inks used in inkjet printing.

In U.S. Pat. No. 5,817,169 Sacripante discloses a hot melt ink composition which uses oxazoline as a vehicle used for the colorant in inkjet printing processes. One of the advantages of this technology is the waxy nature of the hot melt ink creates images that are more waterfast and may be successfully utilized on plain papers. This technology is in contrast with the instant invention, which utilizes an ordinary waterborne, liquid four-color ink pen set.

Accordingly, a need remains for a printing system using water-based inkjet technology which produces permanent images. These permanent images will be consistent and stable with respect to a variety of printed substrates. An ideal situation would be combining the convenience and safety of aqueous inkjet inks with the permanence of electrophotographic copies. The present invention satisfies this in a unique manner which is described herein.

SUMMARY OF THE INVENTION

The invention relates to a fusible material that is added to aqueous ink formulations and provides an improved printed image that is especially suitable for use with inkjet technology.

Further this invention encompasses methods for printing permanent images using inkjet technology which comprises a fusible material formulated with the four-pen ink-set commonly found in water-based color inks used in inkjet printing. The fusible material of the present invention can be formulated as a colorless fluid applied either before or after the color inks are applied to the substrate. The images and print quality achieved by the use of such a fusible material in waterborne ink formulations are comparable in permanence and print quality to those of laser printers and copiers. These images, in black or color, are permanent and will not smear, smudge, run, or the like when exposed to mechanical or chemical abrasion.

Also presented herein are printing devices incorporating the ejection of droplets of fluid on to a substrate and producing a printed page with a permanent image. In this embodiment, the inkjet printer is equipped with a fuser. The fuser of a typical laser printer is commercially available and has been modified for use in an inkjet printer to provide superior image quality and permanence to the printed substrate. In a similar fashion, incandescent lamps or other suitable heating means may be employed.

Moreover this invention provides an improved printing system which produces consistent high quality printed images regardless of the type or quality of printing substrate, such as different types or qualities of paper or transparent sheets used to make overhead projections (transparencies), being used.

In accordance with the foregoing, the present invention relates to an improved printing system for producing stable, water-fast, permanent printed images. The system combines the ease and versatility of traditional water-based inkjet technology with the permanence of laser printing or copying technology (electrophotography).

These and other features and advantages of the current invention will be described below in the Detailed Description of the Invention and succinctly outlined in the claims that follow.

DETAILED DESCRIPTION OF THE INVENTION

The present invention relates to an improved printing system that is capable of producing permanent images on a variety of substrates using waterborne inkjet printing. The invention allows for the inclusion of fusible materials into water-based inks and demonstrates the increased permanence of the images produced.

The standard ink set components known and used in inkjet printers comprise four colors of ink, namely yellow, magenta, cyan, and black. This set is often referred to as a "four pen" system. These four pens are made of various materials and are formulated into aqueous inks.

Each of the standard four pens contains a water-soluble or insoluble dye having an anionic group, or when a pigment is used as a colorant, the pigment is either self-dispersing or is aided in solubility by a dispersant. In many applications, both pigments and dyes are used for coloring the ink. The ink formulation also typically contains water, a water-miscible solvent, and other components such as a biocide, viscosity modifiers, a pH adjuster, preservatives, surfactants, and the like.

Pigments—When a pigment is used as a coloring material in the ink composition of the present invention, the amount of pigment used is within the range from about 0.5 to about 20 weight percent. A more preferable range of pigment ranges from about 1 to about 15% by weight, still more preferably is a range of from about 2% to about 12% by wt.

An example of a pigment used for a black ink is carbon black. The carbon black may be produced by either a furnace or channel method. The primary particle size of this material ranges from 15 to 40 $\mu$m, specific surface area is 50 to 300 m2/g, and has oil absorption from 40 to 150 ml/100 g, the volatile component is 0.5 to 10%, and the pH value may range from 2 to 9. Examples of suitable commercially available carbon blacks include No. 2300, No. 900, MCF88, No. 33, No. 40, No. 45, No. 52, MA&, MA8, No. 2200B, Raven 1255, Regal 400R, Regal 330R, Regal 660 R, Mogul L, Color Black FW1, Color Black FW18, Color Black S170, Color Black S150, Printex 35, and Printex U.

In this invention, the black colorants that were employed include Novofil Black BB-03, and Hostafine Black TS. The Novafil material is a pigment that is approximately 27% pigment dispersion based on anionic dispersing agents. It contains C.I. Pigment Black 7, carbon black and is an ultrafine pigment dispersion suitable for all water based inkjet application. These pigments are available from Clairiant Corp., Coventry, R.I.

Hostafine Black TS contains hydrophilic ultrafine pigment dispersions based on non-ionic dispersing and wetting agents. It contains carbon black and has a pigment concentration of 33%.

Other black colorants which may be used include those listed in the Color Index and in Textile Chemist and Colorist reference publications. Water-soluble black colorants are commercially available from colorant vendors such as Cabot Corporation, Orient Chemical, and other manufacturers. Surface modified colorants from these manufacturers are initially water insoluble colorants which, by certain modifications, are solubilized or stabilized as fine dispersions in water to prevent agglomeration. See U.S. Pat. Nos. 5,707,432; 5,630,868; 5,571,311; and 5,554,739 for a discussion of modified carbon black pigments and methods of attaching functionalized groups to aid in their solubility.

Examples of pigments used for a yellow ink include C.I. Pigment Yellow 1, C.I. Pigment Yellow 2, C.I. Pigment Yellow 3, C.I. Pigment Yellow 13, C.I. Pigment Yellow 16, C.I. Pigment Yellow 83, and the like. Examples of pigments used for magenta ink include C.I. Pigment Red 5, C.I. Pigment Red 7, C.I. Pigment Red 12, C.I. Pigment Red 48 (ca), C.I. Pigment Red 48 (mn), C.I. Pigment Red 57 (Ca), C.I. Pigment Red 112, C.I. Pigment Red 122, and the like. Examples of pigments used for a cyan include C.I. Pigment Blue 1, C.I. Pigment Blue 2, C.I. Pigment Blue 3, C.I. Pigment Blue 5:3, C.I. Pigment Blue 16, C.I. Pigment Blue 22, C.I. Vat Blue 4, C.I. Vat Blue 6, and the like. Pigments whose performance properties are satisfactory when formulated for the present invention are considered to be within its scope.

In the instant invention, colorants used include Hostafine Rubine F6B and Hostafine Blue B2G available from Clariant, Coventry, R.I. Hostafines are hydrophilic ultrafine pigment dispersions based on nonionic dispersing and wetting agents, available in all colors. In this disclosure, Hostafine Rubine F6B is magenta with a 40% pigment content. Hostafine Blue B2G is blue with 40% pigment as well. These colorants are manufactured for suitability with water-based inkjet inks.

Any pigment, dye, or pigment-resin system available and compatible with the other formulated ingredients of the fusible material of this invention may be used as colorants. An important factor that the formulator must keep in mind is thermal instability exhibited by certain tri- and tetrakis-azo dyes. Such thermal instability may lead to charring of insoluble deposits (kogation), which is to be avoided.

Dyes—Dyes, whether water-soluble or water-insoluble, may be employed in the practice of the present invention. Examples of water-soluble dyes include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine O (Basic Yellow 2), all available from Aldrich Chemical Company. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow.

The ink formulation comprises a colorant plus a vehicle. A typical formulation for an ink useful in the practice of this invention includes the colorant, present in about 0.5 to about 20 weight percent, one or more co-solvents, present from 0 to 50 weight percent, one or more water-soluble surfactants, present in about 0.1 to 40 weight percent, one or more high molecular weight colloids present in from 0 to about 3 weight percent. The balance of the formulation is purified water. The colorless fluid is similar except for the absence of a colorant.

One or more co-solvents may be added to the formulation of the ink of this invention. Classes of co-solvents include, but are not limited to, aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like.

One class of preferred co-solvents that provides water miscibility to polymers is glycols. A particularly preferred glycol is polyethylene glycol, commonly abbreviated as PEG. Polyethylene glycol is hydrophilic.

A preferred surfactant employed in the present invention includes Noigen10™. Noigen10™ is a commercially available polymerizable surfactant available from the Montello Company of Tulsa, Okla. Noigen10™ contains polyethylene glycol as a hydrophilic group and an octyl or nonyl phenol as a hydrophobic group. This type of surfactant, which can accommodate both hydrophobic and hydrophilic moieties, is a preferred ingredient in the formation of the fusible material of this invention.

However, other water-soluble surfactants may be employed in the formulation of the vehicle of the ink of this invention. The purpose of surfactants as described herein is to facilitate the miscibility of the ingredients of the ink composition. This is especially important if the fusible material of the ink composition contains both hydrophilic and hydrophobic groups. The surfactant(s) used are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substitued amine oxides, and the like. The amount of surfactant added to the formulation of this invention may range from less than one to about 10 weight percent. A more preferred amount is from 1 to about 3 weight percent.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents which are routinely used in ink formulations. Examples of suitable microbial agents include, but are not limited to, Nuosept (Nudex, Inc.), Ucarcide (Union carbide Corp.), Vancide (R.T. Vanderbilt Co.), and Proxel (ICI America).

Sequestering agents such as EDTA (ethylene diamine tetra acetic acid) may be included to eliminate the deleterious effects of heavy metal impurities, and buffer solutions may be used to control the pH of the ink. Viscosity modifiers may also be present, as well as other additives known to those skilled in the art to modify properties of the ink as desired.

Each of the ingredients in the fusible material are present for a specific reason. For example, particle size and distribution, stability, surface tension, and various rheological properties are primarily controlled by the type and amount of surfactant employed.

Kogation refers to the charring of insoluble deposits on the printer's heating elements. This clogs the inkjet print heads and is a problem common to thermal inkjet printers. For the fusible materials to be resistant to kogation, they must be soluble or miscible in the ink solvents at higher temperatures or in super heated solvent/water vapor. The invention allows inclusion of fusible materials in water based inks used in inkjet printing. These materials are soluble in the ink composition at higher temperatures or in super-heated solvent/water vapor. As used herein, superheating means the heating of a substance above the temperature at which a change of state would ordinarily happen without the change of state occurring.

Fusible Materials

The laser or copier toners generally contain polymers made from a variety of materials such as polyoxazolins, urethan/acrylic block or blended polymers, and polymers made from acrylate monomers, such as silicone acrylate (commercially available from the Sartomer Company, (Exton Pa.)), polycarbonates, polyvinylpyrrolidine, styrene-butadiene latexes, PEG-amine modified and/or diamine cross linked polyene-maleic anhydride such as ethylene maleic anhydride or octadecene-maleic anhydride, or rosin-maleic anhydride polymers.

Most of the toners materials listed supra are hydrophobic polymers. They are present in electrophotography as small, discrete grains that outline the image on a substrate prior to fusion. As such, these materials have been incompatible with and not viable for use in water-based inkjet inks. This invention utilizes this type of hydrophobic material, heretofore incompatible with water, a co-solvent such as PEG, and a variety of other ingredients, in a waterborne ink formulation that creates permanent images or in a colorless fluid which may be applied either before or after the ink.

Among the properties of interest for applications of some of these toners include glass transition temperature (Tg) and melt index. As used herein, glass transition temperature (Tg) will mean the transition that occurs when a liquid is cooled to an amorphous or glassy solid. It also may be the change in an amorphous region of a partially crystalline polymer from a viscous, rubbery state to a hard or brittle one brought about by change in temperature.

The glass transition temperature, Tg, reflects the mechanical properties of polymers over a specified temperature range. Below Tg polymers are stiff, hard, brittle, and glass-like; above Tg they are relatively soft, limp, stretchable, and somewhat elastic. The Tg determines the performance of the polymer; below Tg the majority of the polymer chains have a relatively fixed configuration and little motion takes place in the polymer. Above Tg the polymer chain has sufficient thermal energy for rotation or oscillation. Thus the Tg temperature marks the onset of polymer mobility.

Chemical reactivity, mechanical and dielectric relaxation, flow, load-bearing capacity, hardness, tack, heat capacity, refractive index, thermal expansivity, creep, crystallization, and diffusion differ markedly below and above Tg. In this invention, Tg and melting temperature Tm may be used interchangeably.

The melt index (M.I.) refers to the number of grams of a thermoplastic resin at 190 degrees C. that can be forced through a 0.0825 inch (2.0955 millimeter) orifice in 10 minutes by a 2160 gram force. These definitions and those of related terms may be found in the *McGraw-Hill Dictionary of Scientific and Technical Terms*, $5^{th}$ Edition, Edited by S. Parker, 1994.

Both the Tg and the M.I. reflect certain properties of polymeric materials over a specified temperature range. The properties of importance to the materials that impart permanence to inkjet images include such hardness, elasticity, and viscosity. In this invention, the materials which are used to improve permanence of the images produced by inkjet printing fluid have a Tg that may range from about 40 to about 140 degrees C. A more preferred range of glass transition temperatures will range from about 50 to about 90 degrees C. Melt index (M.I.) values for the instant materials may range from about 400 to about 3000 grams/10 minutes. A more preferred range may be from about 1800 to about 2500 grams/10 minutes. A still more preferred range is from about 2000 and 2250 g/10 min.

The fusible materials used in the instant ink formulations for permanence must be made soluble or mixable with the other waterborne ingredients in the ink. It has been found that hydrophobic materials which may be present in hydrophobic toners, can be combined in an aqueous system is to form emulsions or latexes. The fusible materials have successfully been synthesized and shown to perform in aqueous ink systems to produced images with the quality and permanence heretofore only achieved in electrophotography.

Presented herein are representative examples of syntheses of fusible materials that provide permanence to the images formed by the materials and processes of the instant invention. Acrylate esters such as methyl acrylate or methacrylate and methyl butylacrylate, along with vinyl aromatic monomers, such as styrene, were used to prepare polymers that are printed using inkjet technology and then fused after the image has been transferred to a substrate.

The monomers used to form such an emulsion polymer (or latex) may be an alkyl acrylate or methacrylate. These alkyl acrylates or methacrylates comprise alkyl groups with from one to about twelve carbon alkyl groups. Among these are included methyl methacrylate, butyl acrylate, butyl methacrylate, hexyl acrylate and the like. These monomers may be combined with a polymerizable surfactant with both hydrophobic and hydrophilic moieties, such as Noigen, noted above and a vinyl aromatic monomer to prepare polymers that are fusible after the image has been transferred to a substrate.

Among the vinyl aromatic monomers that are contemplated for inclusion in this invention are styrene, substituted styrene, divinyl benzene, vinyltoluene, vinyl naphthalene, polyvinylbenzenes, and isomers thereof. A preferred vinyl aromatic monomer is styrene.

The fusible material that imparts permanence to the printed substrate that is a product of this invention is not limited to emulsion polymers. In fact, the fusible material does not have to be polymeric. The fusible material may be launched as solutions, dispersions, emulsions, liposomes, vesicles, latexes or by any other means that can provide stable distribution of the materials in water.

As will be seen in the Examples, the images made permanent by the ink formulation of this invention are very resistant to smear. This allows enhanced image quality, demonstrated by the transfer of less than 100 mOD In this invention, mOD is measured by running a water-based yellow highlighter (Sanford "Major Accent" Highlighting Marker high pH labeled "Fluorescent") across black lines printed on white bond paper. The amount of ink that smears from the lines relates directly to the permanence of the inkjet ink.

One of the ways to include the fusible material of this invention is to include it in a clear fluid that is not part of the four-color ink set. This technology is sometimes called a "fifth" pen. Fifth pen technology has been used to optimize image quality and water-fastness, but has not been successfully used to improve permanence. However, when using the $5^{th}$ pen to eject the fusible material composition of this invention, the colorless, waterborne liquid coats the substrate and imparts permanence to the printed image.

When the fusible material of this invention is used in a colorless fluid $5^{th}$ pen device, the amount of fluid used to impart permanence to the image may range from about 0.1 to about 4 times the amount of color ink(s) used in forming the image. In other words, there would be a minimum of one drop of colorless fluid applied to the substrate for every ten drops of ink applied. The colorless layer may be applied either over or under the color ink layer.

These clear fluids increase permanence of the color ink images by forming a pigment/polymer dispersant on the surface of the substrate. This reduces penetration of colorant in the media and helps improve the image color, optical density, and brightness of the printed image. The fusible material may also be added to any or all of the colored inks of the standard four-color pen set.

Fuser Device—The printing system of this invention includes a printing apparatus that is equipped with suitable heating means. Heat fusion is most often the way that the image formed by toner particles used in electrophotography are fixed to the printed substrate. Most systems employ a heated roller to fix the image although any other means of supplying heat is included within the scope of this invention.

The heated roller is often a rubber roller impregnated with silicone oil which is preheated to about 90 degrees C. It may also be a metal roller heated with incandescent light or a lamp equipped with a reflector. Certain laser printers employ a ceramic heating element in the fusion stage. When the copier or printer is switched on, waiting time until the machine is ready to use is associated with heating the roller.

The heating means is designed to melt (or fuse) the toner on to the substrate. In high speed systems, flash fusion may be used. Flash fusion involves the use of heated lamps with a specific heat output are used to rapidly heat the toner which then adheres to the substrate. Fusers are commercially available from such companies that manufacture laser printers such as Hewlett-Packard, Canon, Ricoh, and Panasonic. In all cases, the toner particles used in electrophotography are hydrophobic.

A typical laser printer commonly available is the Hewlett-Packard Laser Jet 4L Printer. In the fusing stage, toner is fused into the substrate by heat and pressure to produce a permanent image. The substrate (usually paper) passes between a ceramic heating element protected by a thin Teflon sleeve and a soft pressure roller. This melts the toner and presses it into the substrate. Other laser printers use a halogen heating lamp and require frequent warm-up periods to maintain a minimum standby temperature.

Polymer Synthesis—Polymer syntheses were performed to control parameters such as rate of addition, extent of emulsification, and optimization of the reaction conditions to form a stable, reproducible emulsion polymer with satisfactory performance in the inkjet system of the present invention. The choice of catalyst was of importance as well.

Preliminary studies determined that the general reaction conditions to be used for the fusible material used in the inkjet formulation include use of azo catalyst, heating the reaction using a liquid heating jacket, stepwise addition of reactants in two separate phases, reaction time ranging between 5 and 10 hours, and others. A typical synthesis is described below:

The following examples and comparative examples are intended to illustrate the invention in further detail and not to limit the invention in any way whatsoever.

EXAMPLE 1

Preparation of a Fusible Polymer using Methyl Methacrylate and Butyl Acrylate (Polymer A)

A 2-liter jacketed reaction vessel is charged with water (787.65 g) purified using milliQ system of purified water manufactured by Millipore Corporation. The reactor is heated to 60° C. under positive pressure of nitrogen. A syringe is filled with 106.64 g of 1.49% aqueous solution of VA 440 (2,2'-Azobis(N,N'-dimethyleneisobutyramidine) dihydrochloride, (WaKo Pure Chemical Industries Ltd., Japan). A graduated addition funnel is filled with Noigen 10 (Montello Company, Tulsa, Okla.), (5.04 g), butyl acrylate (40.01 g), methyl methacrylate (60.10 g), and iso octyl mercaptopropionate (0.78 g) and is fitted onto the reactor. One tenth of each of the solutions in both the syringe and the graduated cylinder is added every 15 minutes until the addition is complete.

Heat is supplied and stirring is continued for 7 hours after the additions are complete. The resulting emulsion is then filtered through a sequence of filters according to the following procedures. Four 11 μm Whatman filter papers are used to filter 500 ml of solutions. Six 2.7 μm GF/D Whatman filters are needed to filter the entire solution. The resulting milky emulsion is used to prepare inks containing Hostafine and Novofil colors. The glass transition temperature of Polymer A is 25–28° C.

EXAMPLE 2

Preparation of a Fusible Polymer using Styrene and Methyl Methacrylate (Polymer B)

Another fusible polymer is synthesized using styrene, methyl methacrylate, and a polymerizable surfactant in the following manner. A 2L jacketed reaction vessel is heated to 60° C. under nitrogen and charged with 393.4 g of water purified using MilliQ system. Organic components Noigen 10 (2.5 g), styrene (30 g), methyl methacrylate (20 g), and CTA (iso octyl mercaptopropionate) (0.375 g) are transferred to a glass syringe. The initiator solution is prepared by dissolving VA 440 (2,2'-Azobis(N,N'-dimethyleneisobutyramidine) dihydrochloride (0.796 g) in MilliQ water (52.9 g). The reaction is performed by addition of 10% of each of the solutions every 15 minutes. The heating and stirring is continued for 7 hours after additions are complete. The emulsion is filtered using following filters, 4, 11 μm Whatman, 3, 20 um msi with Whatman gf/d 2.7 um pre-filter, 1, 5 um msi with Whatman gf/d 2.7 um prefilter to give a polymer A emulsion. The glass transition temperature of Polymer B is 95–105° C.

EXAMPLE 3

Ink Formulation Procedure

The table below indicates the amount and type of ingredients used to prepare samples of ink formulated with the polymers synthesized by the above procedures. All the inks are filtered through 5 micron nylon filters available from Micron Separations, Inc. The inks are filled in HP 2000C pens and warmed to 60° C. before printing.

| Ink formulation A: | | | | |
|---|---|---|---|---|
| | Novofil black BB-03 | Hostafine Black TS | Hostafine Rubine | Hostafine Blue B2G |
| Pigment Concentrate | 14.8 g | 13.3 g | 10.0 g | 12.2 g |
| 2-Pyrrolidine | 10.0 g | 10.0 g | 10.0 g | 5.0 g |
| 1,5 Pentanediol | 10.0 g | 10.0 g | 15.0 g | 0.0 g |
| Polymer A emulsion | 21.4 g | 21.4 g | 21.4 g | 21.4 g |
| Water | 43.8 g | 45.3 g | 43.6 g | 41.4 g |
| Multranol 4012 | 10.0 g | 10.0 g | 10.0 g | 5.0 g |
| TetraEthylene Glycol | | | | 15.0 g |

| Ink formulation B: | |
|---|---|
| Ingredient | Quantity (wt %) |
| Cabojet 300 (10% conc.) Black | 27.01 |
| Polymer B (10%) | 30.14 |
| Primer Polymer | 6.39 |
| Leg-1 | 8 |
| Surfanol-465 | 0.07 |
| Coco betaine | 0.2 |
| Dodecanol | 0.14 |

-continued

Ink formulation B:

| Ingredient | Quantity (wt %) |
|---|---|
| Leg-7 | 1 |
| 2Pyrrolidone | 7.02 |
| Neopentyl Alcohol | 0.41 |
| Water | 19.87 |

Notes on the ink formulation ingredients:

2-Pyrrolidine is used as a penetrant, used to facilitate interaction between the ink and the substrate 1,5-Pentanediol and tetraethylene glycol are used as humectants, to maintain moisture and keep the pen from drying Multranol 4012, LEG 1, LEG 7, Coco betaine, Surfanol 465 are commercially available surfactants.

Smear resistance of Polymer A with surface modified colorant (values in mOD)

| Fuser | GBND | CDCY | UJCT | PMCY | PNAT |
|---|---|---|---|---|---|
| Before | 551 | 384 | 353 | 544 | 516 |
| After | 101 | 93 | 72 | 107 | 91 |

EXAMPLE 4

Synthesis of a 'primer polymer', which is not smear resistant, but boosts the performance of fusible materials. See U.S. patent applications, Ser. Nos. 09/120,046 and 09/120,270, both filed Jul. 21, 1998.

A primer polymer used to improve the performance of fusible materials is synthesized as follows: 5684.9 g water and 24.0 g potassium persulfate is charged in a reactor. The organic part of the monomer feed (747.0 g methyl methacrylate (MMA), 1073.7 g hexyl acrylate (HA), 280.1 g methoxy polyethylene glycol (350) methacrylate (from Polysciences, Inc.) 233.4 g (acrylic acid) AA, and 23.3 g iso-octyl thioglycolate (from Zeneca, Inc.) is added to the feed tank, followed by the water phase of the monomer feed (1082.2 g water and 65.4 g Rhodcal). The monomer feed is emulsified until a stable monomer feed is obtained. After the reactor phase reaches 90° C. the addition of the monomer feed (150 min) is started. Directly after finishing monomer feed 1 the feed tank is rinsed with 75.0 g water. After this addition the reactor is kept at 90° C. for another 30 min, after which the burn up reaction is performed. After the burn up the reaction is cooled down to 30° C. and 28.7 g Proxel GXL in 30.0 g water is added. Extra water should be added if necessary for solids correction. Additionally, a pH correction is performed by the addition of 26.1 g of an aqueous 10% KOH solution to obtain a pH of 8.24. After filtration over 50 um filter almost no sediment is obtained. Synthesis data and smear performance results from the synthesis of the primer polymer are as follows:

Monomer ratio MMA/HA/MPEG (350) MA/AA 32/46/12/10

Polymer prepared at 25% solids

| Potassium Persulfate | 1.03% on monomers |
|---|---|
| Rhodacal RS710 | 2.80% on monomers |
| BRIJ 92 | 1.55% on monomers |
| iso-octyl thioglycolate | 1.00% on monomers |

EXAMPLE 5

Permanence Testing: Procedures

The smear resistance which serves as a measure of mechanical and chemical (solvent) abrasion is measured by transfer of amount of color in milli optical density (mOD) units measured using MacBeth RD918 optical density meter (available form MacBeth, a division of Kollmorgen Instruments Corporation, New Windsor, N.Y.).

After running basic (fluorescent) highlighters twice over a set of bars printed using an ink jet printer containing the respective inks.

The permanence of images demonstrated by electrophotography (laser printing or copying), show the least transfer and lowest mOD numbers. Since the MacBeth instrument reports mOD units of transferred color in this experiment, the lower number indicates less transfer. Therefore, the lower numbers indicate better performance. The markers used for this purpose are available from Sanford corporation or any office supply center under the name 'Major Accent' read through highlighting marker and 'fluorescent' (alkaline highlighting marker).

The tables below show comparative values of some of the commercially available transfer obtained from such smear tests. The process of 'fusion' is important for imparting permanence to the inks of the invention. Therefore, the comparison of 'before fusion' and 'after fusion' data indicates the efficiency of the particular fusible material. Fusion indicates a treatment through heat press HIX N800 3 seconds at 190° C. or running the paper through a fuser attached to an ink jet printer so the paper path directly coincides with the fuser uptake. The fuser is set at 200° C. with a residence time of 3 sec. Experiments were performed across a set of five papers to prove effectiveness of this approach on a variety of paper substrates.

As can be seen in Tables 1–4, both polymers A and B of the instant invention produced comparable results. The five papers used were champion data copy (CDCY), Gilbert bond (GBND), Stora Papyrus MultiCopy (PMCY), Stora Papyrus Natura (PNAT) and union Camp Jamestown (UCJT) available commercially.

Paper's propensity to absorb moisture because of the hydrophilic nature of he cellulose from which it is made has considerable implications for its behavior with various ink formulations. Paper in an ambient relative humidity of 50% can contain up to eight weight percent water. This moisture can become the controlling factor in the performance of the paper as a substrate in both electophotography and inkjet printing.

Permanence Testing: Results:

TABLE 1

Two pass highlighter smear 5 min after printing
Hostafine Black TS and Polymer A in ink formulation
Values in mOD

| FUSER | Alkaline | | | | | Acid | | | | |
|---|---|---|---|---|---|---|---|---|---|---|
| | CDCY | GBND | PMCY | PNAT | UCJT | CDCY | GBND | PMCY | PNAT | UCJT |
| Before | 243.3 | 330.0 | 96.7 | 210.0 | 280.0 | 220.0 | 280.0 | 96.7 | 220.0 | 266.7 |
| After | 40.0 | 60.0 | 36.7 | 40.0 | 40.0 | 43.3 | 53.3 | 20.0 | 40.0 | 33.3 |

TABLE 2

Two pass highlighter 5 min after printing
Hostafine Blue B2G and Polymer A in Ink Formulation
Values in mOD

| FUSER | Alkaline | | | | | Acid | | | | |
|---|---|---|---|---|---|---|---|---|---|---|
| | CDCY | GBND | PMCY | PNAT | UCJT | CDCY | GBND | PMCY | PNAT | UCJT |
| Before | 70.0 | 176.7 | 50.0 | 253.3 | 43.3 | 50.0 | 136.7 | 33.3 | 183.3 | 26.7 |
| After | 20.0 | 23.3 | 26.7 | 20.0 | 10.0 | 10.0 | 20.0 | 6.7 | 20.0 | 10.0 |

TABLE 3

Two pass highlighter 5 min after printing
Hostafine F6B and Polymer A in Ink Formulation
Values in mOD

| FUSER | Alkaline | | | | | Acid | | | | |
|---|---|---|---|---|---|---|---|---|---|---|
| | CDCY | GBND | PMCY | PNAT | UCJT | CDCY | GBND | PMCY | PNAT | UCJT |
| Before | 116.7 | 220.0 | 86.7 | 353.3 | 96.7 | 40.0 | 170.0 | 40.0 | 286.7 | 40.0 |
| After | 0.0 | -3.3 | -6.7 | -6.7 | 10.0 | 10.0 | 6.7 | 10.0 | 16.7 | 0.0 |

TABLE 4

Two pass highlighter 5 min after printing
Novofil BB-03 Black and Polymer B in Ink Formulation
Values in mOD

| FUSER | Alkaline | | | | | Acid | | | | |
|---|---|---|---|---|---|---|---|---|---|---|
| | CDCY | GBND | PMCY | PNAT | UCJT | CDCY | GBND | PMCY | PNAT | UCJT |
| Before | 50.0 | 316.7 | 110.0 | 466.7 | 50.0 | 30.0 | 266.7 | 60.0 | 376.7 | 36.7 |
| After | 10.0 | 23.3 | 30.0 | 63.3 | 10.0 | 0.0 | 10.0 | 20.0 | 40.0 | 0.0 |

TABLE 5

Comparative Example A: HP 2000C printer black ink:
Two pass highlighter 5 min after printing
HP 2000C Black
Values in mOD

| FUSER | Alkaline | | | | | Acid | | | | |
|---|---|---|---|---|---|---|---|---|---|---|
| | CDCY | GBND | PMCY | PNAT | UCJT | CDCY | GBND | PMCY | PNAT | UCJT |
| Before | 272.50 | 249.67 | 230.67 | 389.00 | 393.50 | 237.33 | 219.00 | 207.33 | 472.00 | 277.67 |
| After | 318.50 | 275.50 | 309.50 | 479.17 | 473.67 | 157.17 | 154.00 | 212.33 | 361.17 | 317.50 |

TABLE 6

Comparative Example B: Canon BJC 800 J printer Black ink with clear under printing fluid (5th Pen):
Two pass highlighter 5 min after printing
Canon BJ F 800 Black
Values in mOD

| | Alkaline | | | | | Acid | | | | |
|---|---|---|---|---|---|---|---|---|---|---|
| FUSER | CDCY | GBND | PMCY | PNAT | UCJT | CDCY | GBND | PMCY | PNAT | UCJT |
| Before | 435 | 560 | 557 | 433 | 384 | 453 | 367 | 467 | 360 | 327 |
| After | 454 | 527 | 535 | 503 | 407 | 333 | 325 | 327 | 253 | 358 |

TABLE 7

Comparative Example C: mOD results from electrophotographic (laser printer HP Laser Jet 4L Printer C2003A)
Two pass highlighter 5 min after printing
Laser Printer
Values in mOD

| | Alkaline | | | | | Acid | | | | |
|---|---|---|---|---|---|---|---|---|---|---|
| FUSER | CDCY | GBND | PMCY | PNAT | UCJT | CDCY | GBND | PMCY | PNAT | UCJT |
| Before | NA | NA | NA | NA | NA | NA | NA | NA | NA | NA |
| After | 1 | 4 | 0 | 2 | 0 | 0 | 0 | 0 | 0 | 0 |

TABLE 8

Comparative Example D: mOD results from electrophotographic copy Lanier 6765 Office Copier.
Two pass highlighter 5 min after printing
Laser Copier
Values in MOD

| | Alkaline | | | | | Acid | | | | |
|---|---|---|---|---|---|---|---|---|---|---|
| FUSER | CDCY | GBND | PMCY | PNAT | UCJT | CDCY | GBND | PMCY | PNAT | UCJT |
| Before | NA | NA | NA | NA | NA | NA | NA | NA | NA | NA |
| After | 0 | 1 | 0 | 0 | 0 | 0 | 0 | 0 | 0 | 0 |

It can be seen that the permanence testing results of the instant invention, using a variety of pigments and more than one fusible material (Tables 1–4) exhibit much better permanence as compared to images produced by other inkjet printers. The mOD values before fusing, as seen in the above tables, are as low as 40, and are much lower than those in Tables 5 and 6. The mOD values in Table 5 (Hewlett-Packard) and Table 6 (Canon) are for current state of the art inkjet printers. They are consistently greater than 200.

The mOD values for the same Examples and Comparative Examples in the above Tables after fusion are even more striking. The mOD values for the examples of the invention drop as low as 10 or less. In the comparative examples, the mOD values range from 154 to 535. In many cases, the mOD values are even higher after than before fusing. This shows that the inks in currently used and commercially available inkjet printers do not produce images that are made permanent by fusion.

In contrast, the values for mOD shown in Table 7 (HP Laser Jet 4L Printer C2003A) and Table 8 (Lanier 6765 Office Copier) are less than 10.

It is clear that this invention combines the permanence of electrophotography with the desirable features of inkjet technology.

What is claimed is:

1. A method for creating permanent images on a substrate with inkjet printers comprising:
    providing an inkjet printer having a first inkjet pen containing a color-containing ink composition and a second inkjet pen containing a fusible material-containing composition, said fusible material-containing composition consisting essentially of said fusible material and a vehicle;
    jetting said color-containing ink composition and said fusible material-containing composition onto said substrate such that said color-containing ink composition and said fusible material-containing composition are in contact on said substrate forming a mixture; and
    fusing said mixture on said substrate thereby forming an image that undergoes minimal transference of color upon chemical or mechanical abrasion as measured by mOD values ranging between 0 and 50.

2. The method of claim 1 wherein the said fusible material is an emulsion polymer synthesized from a member selected from the group consisting of alkyl methacrylates comprising alkyl groups with from one to about twelve carbon atoms, vinyl aromatic monomers, polymerizable surfactants with both hydrophilic and hydrophobic moieties, and mixtures thereof.

3. The method of claim 2 wherein said alkyl methacrylate is selected from the group consisting of methyl methacrylate, butyl methacrylate, hexyl acrylate, and mixtures thereof.

4. The method of claim 2 wherein said vinyl aromatic monomer is selected from the group consisting of styrene, substituted styrene, divinyl benzene, vinyltoluene, vinyl napthalene, polyvinylbenzenes, and isomers thereof.

5. The method of claim 2 wherein said polymerizable surfactant comprises polyethylene glycol as the hydrophilic group and an octyl or nonyl phenol as the hydrophobic group, and mixtures thereof.

6. The method of claim 1 wherein said fusible material is an emulsion polymer synthesized from components selected from the group consisting of polyoxazolins, urethane/acrylic block or blended polymers, polycarbonates, polyvinylpyrrolidine, styrene-butadiene latexes, PEG-amine modified polyene-maleic anhydrides, PEG diamine cross linked polyene-maleic anhydrides, ethylene maleic anhydride, octadecene-maleic anhydride, rosin-maleic anhydride polymers, and mixtures thereof.

7. A printing system for thermal or piezo inkjet printers comprising:
   a) a water-based ink set of 4 pens individually containing cyan, magenta, yellow, and black ink configured for printing inks on a substrate;
   b) a $5^{th}$ pen containing an inkjettable water-based fusible material-containing composition configured for printing the fusible material-containing composition on said substrate such that contact occurs between any of said inks and said fusible material-containing composition, thus forming an image, said fusible material-containing composition consisting essentially of the fusible material and a vehicle; and
   c) a fuser configured for fusion of the image onto the substrate resulting in a permanent image with minimal transference of color upon chemical and/or mechanical abrasion as measured by mOD values ranging between 0 and 50.

* * * * *